Oct. 30, 1945.   N. V. HENDRICKS   2,388,056
ADJUSTABLE SUPPORT
Filed July 17, 1943   2 Sheets-Sheet 1
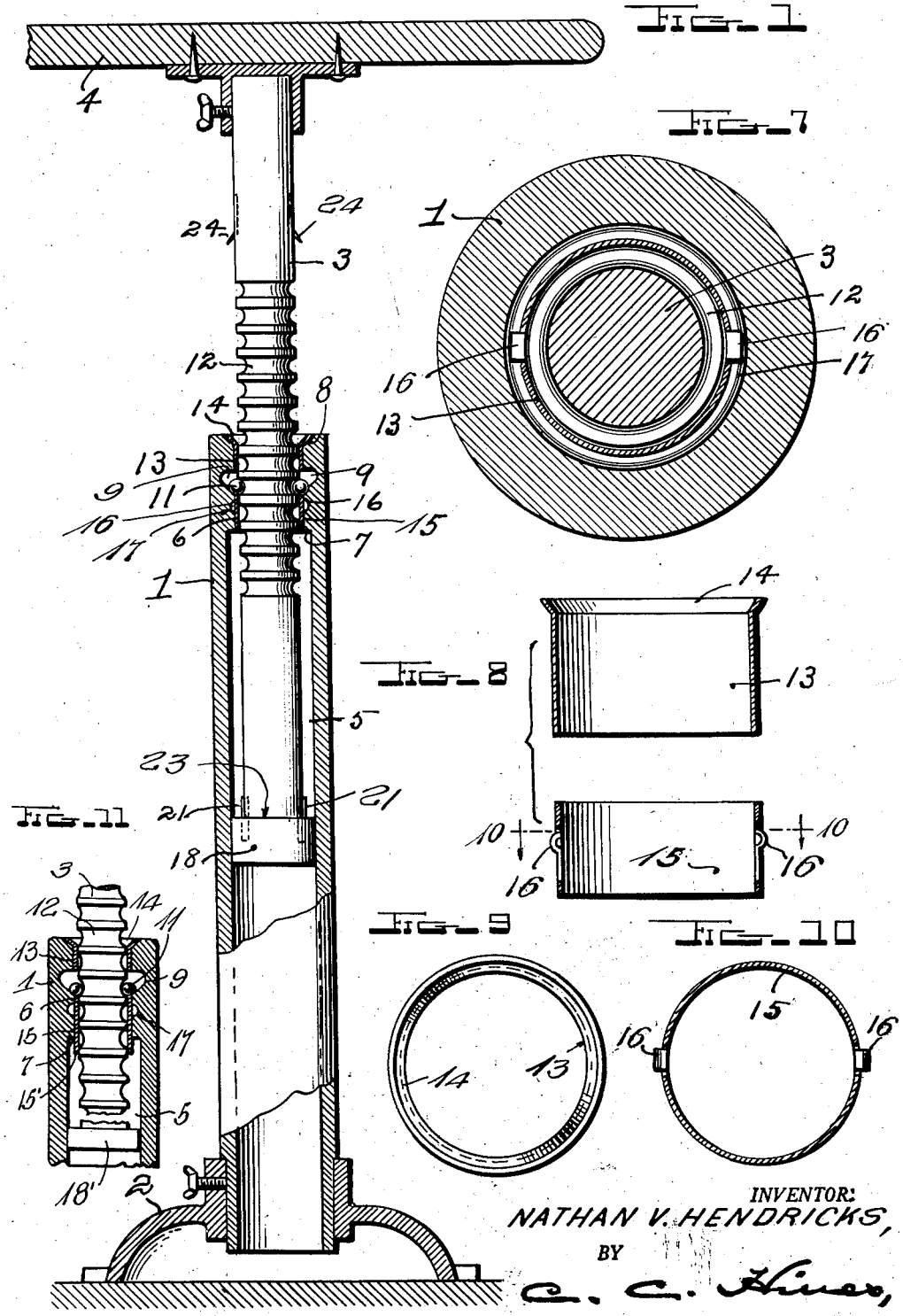
INVENTOR:
NATHAN V. HENDRICKS,
BY
C. C. Hines,
ATTORNEY.

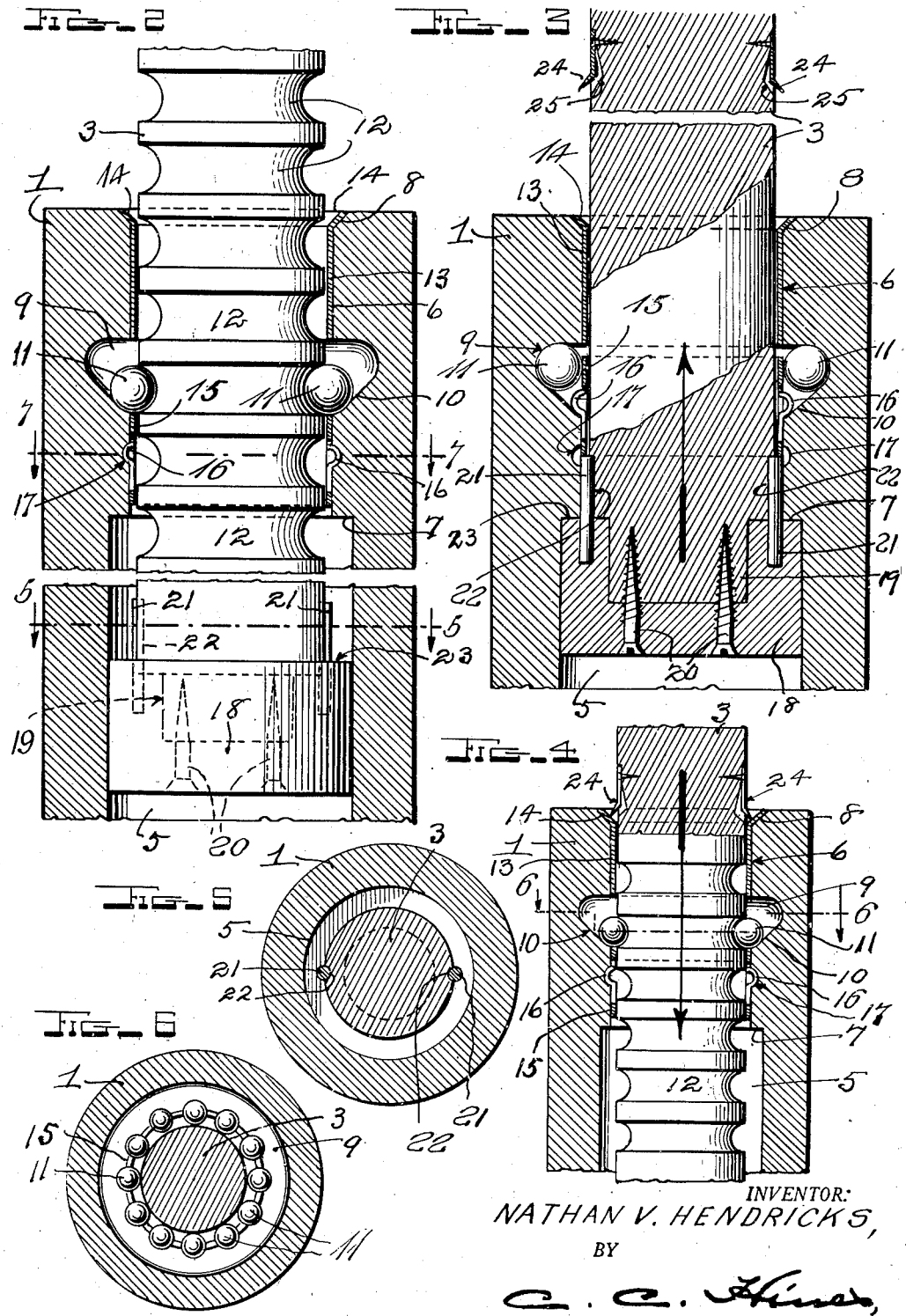

Patented Oct. 30, 1945

2,388,056

UNITED STATES PATENT OFFICE 2,388,056

ADJUSTABLE SUPPORT

Nathan V. Hendricks, Adrian, Mich.

Application July 17, 1943, Serial No. 495,235

8 Claims. (Cl. 155—94)

This invention relates to adjustable supports, and has particular reference to vertically adjustable supports for stools, chairs, tables and other like articles.

The object of the invention is to provide a support including a rod or like member which is vertically adjustable in a standard or like supporting member and wherein novel and improved means are employed for permitting adjustment of the rod and for locking the same in a desired position of adjustment.

A further object of the invention is to provide a construction of locking means which will permit rotation of the rod in any of its adjusted positions without affecting the locking action.

A still further object of the invention is to provide a construction which allows the parts to be readily assembled for use and disassembled for repairs or other purposes.

The invention consists in the novel, construction, combination of parts hereinafter fully described and claimed, and as shown in the accompanying drawings, in which:

Fig. 1 is a view, partly in elevation, and partly in longitudinal section of an adjustable support embodying the invention.

Fig. 2 is a similar view, on an enlarged scale, showing the rod locked at a desired position of adjustment.

Fig. 3 is a similar view, showing the rod raised to its upward limit and the locking connections released for a setting action to permit the rod to be moved downward to bring the locking elements back to normal position and thereafter moved upward to adapt it to be disposed at and locked in a desired position of adjustment.

Fig. 4 is a view similar to Figs. 2 and 3, showing the rod moved fully downward to return the locking elements to normal position, allowing the rod to be moved upward to engage a desired locking groove in the rod with the locking balls.

Fig. 5 is a section on the line 5—5 of Fig. 2.

Fig. 6 is a section on the line 6—6 of Fig. 4.

Fig. 7 is a section on the line 7—7 of Fig. 2.

Fig. 8 is a longitudinal section through the sliding locking and releasing sleeve or collar.

Fig. 9 is a top plan view of the upper reinforcing and guiding sleeve.

Fig. 10 is a section on line 10—10 of Fig. 8 through the lower sleeve member of the ball retaining and retracting means.

Fig. 11 is a sectional view, showing a modification.

Referring now more particularly to the drawings, wherein the invention is shown applied to a stool or like structure, 1 designates a hollow upright standard which is mounted on a suitable hollow base 2, to which it may be fixedly or detachably secured, and in which standard is slidably and rotatably mounted a supporting rod. To the upper end of this rod may be attached the stool seat, a table top or other like element 4 which is to be adjustably supported by the rod.

The standard 1 is provided with a cylindrical guideway portion 5, extending from its lower end upwardly to a point below its top, and an upper guideway portion 6 of smaller diameter than the guideway portion 5 and extending therefrom to the top or upper end of the standard. A stop shoulder 7 is formed at the lower end of the guideway portion 6 where it joins the guideway portion 5, and a beveled surface or seat 8 is formed at the upper end of the guideway portion 6 where it opens outwardly at the top of the standard. The guideway portion 6 also serves as a locking and releasing chamber in which the locking and releasing elements or surfaces carried by the standard for coaction with the locking and releasing elements or surfaces on the rod are arranged.

The locking or releasing elements or surfaces provided on the standard consist of an annular locking groove or recess 9 formed in the standard and communicating with the chamber 6 at a point about midway of its height. The upper portion of this groove or recess is generally U-shaped and of maximum depth, while the lower portion thereof is of varying depth and formed by a downwardly and inwardly inclined wall 10, sloping at an oblique angle to the plane of the standard, and gradually increasing the depth of the lower portion of the groove in an upward direction and decreasing it in a downward direction. Seated in this groove 9 is an annular series of locking balls 11 which are movable annularly in the groove and also upwardly and downwardly therein and toward and from the guideway 6 for locking and releasing actions, as hereinafter described. These balls are provided for locking engagement with any one of a number of superposed annular grooves 12 formed at different elevations in the rod 3, and to support the rod in different positions of vertical adjustment.

Fitted in the top of the guideway portion 6 is a stationary reinforcing and guiding sleeve 13 through which the rod 3 extends. This sleeve is of a length approximately equal to the length of the guideway 6 above the groove 9 so that in its normal position the lower edge of the sleeve terminates about in line with the top of the groove 9. The sleeve is suitably bound or secured in position and at its upper edge is formed with an outturned flange 14 which contacts with and rests on the beveled surface 8. In practice the sleeve 13 may be made of a hard and durable metal, such as steel, or other hard and durable material.

Also fitted in the guideway portion 6 is a vertically sliding releasing or unlocking sleeve 15 which is disposed in said guideway portion below the groove 9. This sleeve 15 is of such length that in its normal position its upper edge terminates about in line with the bottom of the groove 9 and so that its lower edge terminates adjacent to and a short distance above the plane of the shoulder 7. The adjacent edges of the sleeves 13 and 15 are spaced so that the balls 11 may lie therebetween and engage the groove 9 and an alined groove 12 in the rod 3. Spring catches or detents 16 are provided on the sleeve 15 to interlock with a keeper groove 17 formed in the wall of the guideway 6, whereby to maintain the sleeve in its normal position and to hold it from downward movement from its normal position. These catches 16, however, are adapted to permit the sleeve 15 to be positively forced upward from its normal position shown in Fig. 2 to a ball retracting position as shown in Fig. 3 and thereafter positively forced backward to normal position. In its ball retracting position the sleeve is adapted to be held temporarily from displacement while the rod 3 is being adjusted by engagement of the catches 16 with the lower inclined wall of the groove 9.

The locking and releasing means comprises, in addition to the grooves 12 formed in the rod and the sleeve 15, a socketed collar or head 18 which fits about a reduced stem 19 at the lower end of the rod and is detachably secured thereto, as by screws 20. This collar or head is of greater diameter than the rod and of a diameter to fit snugly in the guideway 5 to steady and guide the rod in its upward and downward adjusting movements. Projecting upwardly from the collar or head are contact pins 21 the projecting portions of which are partially seated in recesses 22 in the lower portion of the body of the rod so that such portions of the pins may at the limit of the upward movement of the rod enter the guideway 6 and force the sleeve 15 upwardly therein. The upper surface 23 of the collar or head which projects beyond the body of the rod forms a stop for engagement with the shoulder 7 to limit the upward movement of the rod and the extent to which the sleeve 15 may be forced upwardly by the pins 21. Spring contacts or tripping projections 24 are provided on the rod above the grooves 12 to engage the upper edge of the sleeve 15 to force the same downward for a resetting action or return to normal position after having been shifted to releasing position. These projections may recede into recesses 25 to cushion the contact action, and to adapt them to pass downward and upward through the sleeve 13 for coaction with sleeve 15. On a downward movement of rod 3 to engage the projections 24 with the sleeve 15 the projections on engaging the contact flange 14 will be forced into their recesses 25, allowing them to enter the sleeve 13 and after passing the lower end of said sleeve to spring outward to engage the upper edge of sleeve 15, whereupon by downward pressure of the rod the sleeve 15 will be forced backward to normal position. By this upward movement of the sleeve 15 the balls 11 may be forced outward into the groove 9 to allow the rod to be adjusted to different elevations, as hereinafter described. On its upward movement, after forcing down the sleeve 15, the projections 24 on engaging the lower edge of the stationary sleeve will be forced back into the recesses 25, thus allowing the rod to be moved upward without interference through the sleeve 13. The sleeve 15, like the sleeve 13, may be made of hard metal to sustain the wear due to the moving parts and to reduce rubbing friction. The sleeve 13 reinforces the upper part of the standard and sustains the wear resulting from the contact of the rod 3 and projections 24 therewith, adapting the standard to be made of wood or other material of less strength and durability than metal.

Fig. 1 shows one of the positions to which the rod 3 may be adjusted, and from which it may be adjusted to higher or lower positions, and Fig. 2 shows the position of the locking means when the rod is locked in an adjusted position. In each view the rod is shown locked in an intermediate position within the range in which it is adjustable. An upward adjustment of the rod from its lowermost or any intermediate to a higher position is permitted by the locking means without releasing movement of the sleeve 15, but downward movement of the rod from any position cannot be effected without proper movements of the sleeve and rod. Referring to Fig. 2, for example, it will be understood that with the balls 11 engaged with the particular groove 12 shown upward movement of the rod 3 is permitted, as the balls 11 under pressure from the rod will roll up the inclined walls 10 into the deeper portions of the groove 9 and allow the rod 3 to pass until one of the lower grooves 12 registers with the groove 9 and the rod is brought to a state of rest, whereupon the balls will roll back from the inclined walls 10 and into the newly presented groove 12 registering therewith to lock the rod from downward movement in its new position of adjustment. The rod may in this manner be raised and locked at any height within its upward limit of adjustment by such actions of the balls, but the rod cannot be lowered from any locked position of adjustment without a releasing action of the sleeve 15, since any downward movement of or pressure on the rod maintains the balls in locking position. It will thus be understood that no casual downward displacement of the rod from an adjusted position can occur. In any position of adjustment, however, the rod may be rotated to dispose the seat 4 in any convenient position in an orbital path, as in such movement the balls 11 will travel in the groove 9 as a raceway.

Whenever it is desired to adjust the rod so that it may be disposed in any position lower than that which it has occupied, the rod is moved upward to bring collar 18 in contact with shoulder 7 and to cause pins 21 to engage and shift the sleeve 15 upward to the releasing position shown in Fig. 3. When the sleeve is moved to this position the balls 11 are forced out of the groove 12 which they engage and into the upper portions of the grooves 9, whereby the rod is unlocked for free up and down movements, and the sleeve is held in this position by engagement of the detents 16 with the inclined walls 10 of the grooves 9. With the parts in this position the rod 3 is moved fully downward to engage projections 24 with the sleeve 15 in the manner before described and force the sleeve downward until detents 16 again engage groove 17, as shown in Figs. 2 and 4, bringing the sleeve back to normal position, in which the balls 11 are returned to locking position. The balls will then be engaged with an uppermost groove, so that the rod may be moved upward whenever desired to engage the balls with any of the lower grooves to dispose and lock the rod at any of its designed positions of adjustment.

If at any time it should be desired to clean or remove any worn or damaged parts for repairs or replacement, this may be conveniently effected by detaching the standard from the base 2 and detaching the head 18 from the rod 3, whereupon the rod and sleeve may be withdrawn as a unit from the standard. The balls will thereupon drop out of groove 9 and may be removed. In assembling the parts the sleeve 13 is first inserted, then sleeve 15 is inserted and raised just enough to hold the balls in place while they are being put in, sleeve 15 is then raised to its upper locking position, the rod 3 then inserted and the head 18 finally applied.

Fig. 11 shows a modified construction of the sleeve 15 and rod which obviates the use of the pins 21 on the rod. In this construction the sleeve 15 is elongated or provided with an extension 15' which in the normal position of the sleeve projects below the shoulder 7. This extension is adapted to be engaged by the pinless collar 18' on the rod to move the sleeve upward for a releasing action, as will be readily understood.

From the foregoing description, taken in connection with the drawings, the construction and mode of use of the device will be readily understood, and it will be seen that the invention provides a support for stools, tables and like objects which is simple of construction, comparatively inexpensive of production and adapted to permit adjustment of the rod to a desired elevation in a simple and convenient manner and to lock the rod against any possibility of casual downward movement. The parts in practice may be made of wood, metal, plastic materials or any combination of these materials and in a large measure may be turned or molded or otherwise shaped or made without expensive machining. While the structure disclosed is preferred, it is to be understood that changes in the form, construction and arrangement of parts, within the scope of the appended claims, may be made without departing from the spirit or sacrificing any of the advantages of the invention.

Having thus described my invention, I claim:

1. An adjustable support comprising a hollow standard having a keeper groove of maximum depth at its upper part and narrowing toward and having an inclined wall at its lower part, a vertically movable rod having locking recesses at different levels, a locking ball in said groove coactingly engageable with the lower part of the groove and a recess in the rod to lock the rod from vertical movement, said ball being movable out of the recess in the rod and upwardly into the upper part of the groove so as to lie wholly therein to permit upward movement of the rod and being movable downwardly into the lower part of the groove so as to project therefrom and engage a recess in the rod to lock the rod in a desired adjusted position against downward movement, a ball shifting member movable in one direction to force the ball out of the recess in the rod which it engages up into the groove and in the opposite direction to allow movement of the ball down in the groove and its locking engagement therewith and with a recess in the rod, and releasing means actuable by prescribed movements of the rod for shifting the ball shifting member in each direction.

2. An adjustable support comprising a hollow standard having an annular keeper groove of maximum depth at its upper part and narrowing toward and having an inclined wall at its lower part, a vertically movable rod having a plurality of annular spaced locking recesses at different levels, locking balls in said groove coactingly engageable with the groove and a recess in the rod to lock the rod from vertical movement, said balls being movable out of the recess in the rod and upwardly into the upper part of the groove to permit upward movement of the rod and being movable downwardly into the lower part of the groove so as to project therefrom and engage a recess in the rod to lock the rod in a desired adjusted position against downward movement and said balls being movable in the recess which they engage to permit rotation of the rod about its axis in the locked position, a ball shifting member movable in one direction to force the balls out of the recess in the rod which they engage up into the groove and in the opposite direction to allow movement of the balls down in the groove and their locking engagement therewith and with a recess in the rod, and releasing means actuable by a prescribed movement of the rod in each direction for shifting the ball shifting member in that direction.

3. An adjustable support comprising a hollow standard having a locking recess therein and provided above said recess with an annular keeper groove of maximum depth at its upper part and narrowing toward and having an inclined wall at its lower part, a vertically movable rod having a plurality of spaced annular locking recesses at different levels, locking balls in said groove coactingly engageable with the groove and a recess in the rod to lock the rod from vertical movement, said balls being movable out of the recess in the rod and upwardly into the upper part of the groove to permit upward movement of the rod and being movable downwardly into the lower part of the groove so as to project therefrom and engage a recess in the rod to lock the rod in a desired adjusted position against downward movement, said balls being also movable in the recess of the rod which they engage to permit rotation of the rod about its axis, a ball shifting sleeve movable upwardly in the standard to force the balls out of the recess in the rod which they engage up into the keeper groove and said sleeve being movable downwardly in the standard from its upwardly shifted position to allow downward movement of the balls in the keeper groove and their locking engagement therewith and with a recess in the rod, said sleeve being provided with resilient locking elements to respectively engage the locking recess in the standard and the groove to lock it in normal and upwardly shifted positions, and releasing members on the rod actuable by prescribed upward and downward movements of the rod for shifting the sleeve upward and downward.

4. An adjustable support comprising a hollow standard formed with an annular keeper groove of maximum depth at its upper part and narrowing toward and having an inclined wall at its lower part, a deflecting surface on the standard above the groove, a vertically movable rod having a plurality of spaced annular locking recesses located at different levels, locking balls in said groove movable upwardly into the deeper part thereof for permitting upward movement of the rod and downwardly into the narrower part thereof for locking the rod in a desired adjusted position against downward movement, a sliding sleeve movable upwardly in the standard to force the balls up into the groove and downwardly from its upwardly shifted position to allow movement of the balls down in the groove and projection of the balls from the groove to engage a recess in the rod, means on the rod actuable by upward movement of the rod for shifting the sleeve upwardly, and outwardly projecting resilient members on the rod for engagement with the sleeve on a downward movement of the rod for shifting the sleeve downwardly from its upwardly shifted position, said members being movable into the plane of the rod on their movement by the rod toward and from the groove by said deflecting surface.

5. An adjustable support comprising a hollow standard having a keeper groove of maximum depth at its upper part and narrowing toward and having an inclined wall at its lower part, a vertically movable rod having locking recesses at different levels, a locking ball in said groove coactingly engageable with the lower part of the groove and a recess in the rod to lock the rod from vertical movement, said ball being movable out of the recess in the rod and being movable upwardly into the upper part of the groove so as to lie wholly therein to permit upward movement of the rod and being movable downwardly into the lower part of the groove so as to project therefrom and engage a recess in the rod to lock the rod in a desired adjusted position against downward movement, a sliding sleeve movable in one direction to force the ball from a recess which it engages up into the groove to free the rod for vertical movement and in the opposite direction to allow movement of the ball down in the groove and projection of the ball from the groove to engage a recess in the rod, and releasing means actuable by prescribed movements of the rod for shifting the sleeve in each direction.

6. An adjustable support comprising a hollow pedestal having a locking recess therein and having an annular keeper groove therein spaced from said locking recess and provided with an upper enlarged portion and a lower contracted portion including an inclined bottom wall, a rod slidable longitudinally in the pedestal and having a plurality of spaced annular locking grooves formed at different elevations therein, locking balls disposed in the keeper groove for locking engagement with any of the locking grooves in the rod, the balls being engageable by gravity with the lower portion of the inclined bottom wall of the keeper groove and a groove in the rod to lock the rod from downward movement and being adapted to slide up said inclined wall and recede into the keeper groove to permit upward movement of the rod, a sliding sleeve in the standard about the rod which, when in inactive or normal position, will permit the balls to project from the keeper groove into a groove in the rod disposed in alinement with the keeper groove and which may be shifted upwardly to force the balls upwardly into the keeper groove to release the rod, the sleeve being movable thereafter downwardly back to normal position to allow the balls to move back to their above described locking position, said sleeve having locking projections thereon engageable respectively with the locking recess and keeper groove to lock the sleeve respectively in normal and upwardly shifted positions, and projecting means on the rod above and below the sleeve for shifting said sleeve.

7. An adjustable support comprising a hollow pedestal having a locking recess therein and having an annular keeper groove therein arranged in spaced relation to the locking recess and provided with an upper enlarged portion and a lower contracted portion including an inclined bottom wall, a rod slidable longitudinally in the pedestal and having a plurality of spaced annular locking grooves formed at different elevations therein, a sliding sleeve in the pedestal and about the rod, locking balls disposed in the keeper groove for locking engagement with any of the locking grooves in the rod, the balls being normally arranged above the level of the sleeve and movable by gravity into engagement with the lower portion of the inclined wall of the keeper groove and a groove in the rod to lock the rod from downward movement and being adapted to be forced by the sleeve, on an upward movement of the sleeve, into the keeper groove to permit upward movement of the rod, said sleeve being movable downwardly back to normal position to allow the balls to move back to their above described locking position and said sleeve having spring locking projections to respectively engage the locking recess and the keeper groove to lock the sleeve in normal and upwardly shifted positions, and projections on the rod above and below the sleeve operated by prescribed up and down movements of the rod to shift the sleeve upwardly and downwardly.

8. An adjustable support comprising a hollow pedestal having an annular keeper groove therein provided with an upper enlarged portion and a lower contracted sloping portion formed by an inclined bottom wall, a rod slidable longitudinally in the pedestal and having a plurality of spaced annular locking grooves formed at different elevations therein, locking balls disposed in the keeper groove for locking engagement with any of the locking grooves in the rod, the balls being engageable by gravity with the lower portion of the inclined bottom wall and an alined groove in the rod to lock the rod from downward movement and being adapted to slide up said inclined wall and recede into the keeper groove to permit upward movement of the rod, and ball shifting means movable in one direction to force the balls out of the groove in the rod which they engage upwardly and outwardly in the keeper groove and in the opposite direction to allow downward movement of the balls in the keeper groove for locking engagement with the lower portion of the keeper groove and with a groove in the rod.

NATHAN V. HENDRICKS.